(12) United States Patent
Perumalla et al.

(10) Patent No.: US 12,374,068 B2
(45) Date of Patent: Jul. 29, 2025

(54) PROACTIVE PREPARATION OF AN INTELLIGENT ECOSYSTEM IN A MAPPED PHYSICAL SURROUNDING BASED ON A VIRTUAL REALITY (VR) INTERACTION

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Sudhir Alluri, Bangalore (IN); Gunendar Kumar Premchand, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/215,621

(22) Filed: Jun. 28, 2023

(65) Prior Publication Data
US 2025/0005875 A1    Jan. 2, 2025

(51) Int. Cl.
*G06F 3/01* (2006.01)
*G02B 27/01* (2006.01)
(Continued)

(52) U.S. Cl.
CPC .......... *G06T 19/20* (2013.01); *G02B 27/0172* (2013.01); *G06T 7/13* (2017.01); *H04N 13/388* (2018.05); *G06T 2219/2004* (2013.01)

(58) Field of Classification Search
CPC ........ G06F 3/011; G06F 3/017; G06F 3/0482; G06F 3/04815; G06F 3/04847;
(Continued)

(56) References Cited

U.S. PATENT DOCUMENTS 7,372,451 B2    5/2008 Dempski
2018/0131907 A1    5/2018 Schmirler et al.
(Continued)

FOREIGN PATENT DOCUMENTS

CN    109262609 A    1/2019
DE    102017219067 A1    4/2019
(Continued)

OTHER PUBLICATIONS

Caputo, F. et al., "On the use of Virtual Reality for a human-centered workplace design", AIAS 2017 International Conference on Stress Analysis, Sep. 6, 2017, pp. 297-308, Science Direct, Elsevier, B.V., United States.

*Primary Examiner* — Hau H Nguyen
(74) *Attorney, Agent, or Firm* — Jared C. Chaney (57) ABSTRACT

One embodiment of the invention provides a method for proactive preparation of an intelligent ecosystem of Internet of Things (IoT) devices based on a virtual reality (VR) interaction. The method comprises identifying a plurality of machine devices in a physical environment, and identifying a plurality of IoT devices within proximity of the machine devices. The method further comprises providing a VR environment for display on a VR headset of a user. The VR environment comprises a VR model of the physical environment. The method further comprises receiving, as input, VR interaction data indicative of one or more VR interactions of the user in the VR environment. The method further comprises determining, based on the VR interaction data, which of the machine devices the one or more VR interactions involve, and proactively awakening at least one of the IoT devices based on the determining.

20 Claims, 5 Drawing Sheets

(51) Int. Cl.
*G06T 7/13* (2017.01)
*G06T 19/20* (2011.01)
*H04N 13/388* (2018.01)

(58) Field of Classification Search
CPC ....... G06F 3/01; G06F 3/0484; G06T 19/006; G06T 19/20; G06T 2200/24; G06T 2219/2004
See application file for complete search history.

(56) References Cited

U.S. PATENT DOCUMENTS

| | | | |
|---|---|---|---|
| 2019/0114061 A1* | 4/2019 | Daniels | G06F 3/048 |
| 2022/0383594 A1 | 12/2022 | Li et al. | |
| 2023/0130770 A1* | 4/2023 | Miller | G06N 20/00 345/156 |

FOREIGN PATENT DOCUMENTS

| | | | |
|---|---|---|---|
| WO | 2008065458 A2 | 6/2008 | |
| WO | 2018226472 A1 | 12/2018 | |

* cited by examiner

PROACTIVE PREPARATION OF AN INTELLIGENT ECOSYSTEM IN A MAPPED PHYSICAL SURROUNDING BASED ON A VIRTUAL REALITY (VR) INTERACTION

BACKGROUND

The field of embodiments of the invention generally relate to virtual reality (VR) devices.

VR is the use of computer technology to create a simulated environment. VR devices include VR headsets and VR accessories such as controllers, hand trackers, etc. A VR headset is a head-mounted device that provides VR for the wearer. VR headsets are widely used with VR video games but also used in other applications, including simulators and trainers.

SUMMARY

Embodiments of the invention generally relate to virtual reality (VR) devices, and more specifically, proactive preparation of an intelligent ecosystem in a mapped physical surrounding based on a VR interaction.

One embodiment of the invention provides a method for proactive preparation of an intelligent ecosystem of Internet of Things (IoT) devices based on a VR interaction. The method comprises identifying a plurality of machine devices in a physical environment, and identifying a plurality of IoT devices within proximity of the plurality of machine devices. The method further comprises providing a VR environment for display on a VR headset of a user. The VR environment comprises a VR model of the physical environment. The method further comprises receiving, as input, VR interaction data indicative of one or more VR interactions of the user in the VR environment. The method further comprises determining, based on the VR interaction data, which of the plurality of machine devices the one or more VR interactions involve, and proactively awakening at least one IoT device of the plurality of IoT devices based on the determining. Other embodiments include a system for proactive preparation of an intelligent ecosystem of IoT devices based on a VR interaction, and a computer program product for proactive preparation of an intelligent ecosystem of IoT devices based on a VR interaction. These features contribute to the advantages of proactively preparing an intelligent ecosystem to execute and control various autonomous and intelligent physical activities, such as collecting real-time context information.

One or more of the following features may be included.

In some embodiments, a streaming volumetric video comprising a plurality of VR objects is created, where each VR object of the plurality of VR objects maps to a machine device of the plurality of machine devices, and the VR model of the physical environment comprises the streaming volumetric video.

In some embodiments, the VR model is a real-time VR model.

In some embodiments, determining which of the plurality of machine devices the user is remotely controlling comprises determining a current virtual activity of the user in the VR environment based on the VR interaction data, determining a physical activity executing in the physical environment that the current virtual activity maps to, and determining which machine device of the plurality of machine devices the physical activity involves. The user is remotely controlling the machine device using the VR headset.

In some embodiments, determining which of the plurality of machine devices the user intends to remotely control comprises determining a virtual direction of a virtual movement of the user in the VR environment based on the VR interaction data, determining a physical direction in the physical environment that the virtual direction maps to, and predicting a physical activity the user intends to execute in the physical environment and which machine device of the plurality of machine devices the physical activity will involve based on a current virtual activity of the user and the physical direction. The user intends to remotely control the machine device using the VR headset.

In some embodiments, proactively awakening at least one IoT device of the plurality of IoT devices comprises selecting the at least one IoT device for proactive awakening, determining a physical boundary of a physical surrounding area based on the selecting, and collecting real-time context information using each IoT device in the physical surrounding area. Each IoT device selected for proactive awakening is within the physical boundary.

In some embodiments, the plurality of IoT devices comprise one or more sensors.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention generally relate to virtual reality (VR) devices, and more specifically, proactive preparation of an intelligent ecosystem in a mapped physical surrounding based on a VR interaction. One embodiment of the invention provides a method for proactive preparation of an intelligent ecosystem of Internet of Things (IoT) devices based on a VR interaction. The method comprises identifying a plurality of machine devices in a physical environment, and identifying a plurality of IoT devices within proximity of the plurality of machine devices. The method further comprises providing a VR environment for display on a VR headset of a user. The VR environment comprises a VR model of the physical environment. The method further comprises receiving, as input, VR interaction data indicative of one or more VR interactions of the user in the VR environment. The method further comprises determining, based on the VR interaction data, which of the plurality of machine devices the one or more VR interactions involve, and proactively awakening at least one IoT device of the plurality of IoT devices based on the determining. These features contribute to the advantages of proactively preparing an intelligent ecosystem to execute and control various autonomous and intelligent physical activities, such as collecting real-time context information.

In some embodiments, a streaming volumetric video comprising a plurality of VR objects is created, where each VR object of the plurality of VR objects maps to a machine device of the plurality of machine devices, and the VR model of the physical environment comprises the streaming volumetric video.

In some embodiments, the VR model is a real-time VR model.

In some embodiments, determining which of the plurality of machine devices the user is remotely controlling comprises determining a current virtual activity of the user in the VR environment based on the VR interaction data, determining a physical activity executing in the physical environment that the current virtual activity maps to, and determining which machine device of the plurality of machine devices the physical activity involves. The user is remotely controlling the machine device using the VR headset.

In some embodiments, determining which of the plurality of machine devices the user intends to remotely control comprises determining a virtual direction of a virtual movement of the user in the VR environment based on the VR interaction data, determining a physical direction in the physical environment that the virtual direction maps to, and predicting a physical activity the user intends to execute in the physical environment and which machine device of the plurality of machine devices the physical activity will involve based on a current virtual activity of the user and the physical direction. The user intends to remotely control the machine device using the VR headset.

In some embodiments, proactively awakening at least one IoT device of the plurality of IoT devices comprises selecting the at least one IoT device for proactive awakening, determining a physical boundary of a physical surrounding area based on the selecting, and collecting real-time context information using each IoT device in the physical surrounding area. Each IoT device selected for proactive awakening is within the physical boundary.

In some embodiments, the plurality of IoT devices comprise one or more sensors.

Another embodiment of the invention provides a system for proactive preparation of an intelligent ecosystem of IoT devices based on a VR interaction. The system comprises at least one processor and a non-transitory processor-readable memory device storing instructions that when executed by the at least one processor causes the at least one processor to perform operations. The operations include identifying a plurality of machine devices in a physical environment, and identifying a plurality of IoT devices within proximity of the plurality of machine devices. The operations further include providing a VR environment for display on a VR headset of a user. The VR environment comprises a VR model of the physical environment. The operations further include receiving, as input, VR interaction data indicative of one or more VR interactions of the user in the VR environment. The operations further include determining, based on the VR interaction data, which of the plurality of machine devices the one or more VR interactions involve, and proactively awakening at least one IoT device of the plurality of IoT devices based on the determining.

One embodiment of the invention provides a computer program product for proactive preparation of an intelligent ecosystem of IoT devices based on a VR interaction. The computer program product comprises a computer readable storage medium having program instructions embodied therewith. The program instructions are executable by a processor to cause the processor to identify a plurality of machine devices in a physical environment, and identify a plurality of IoT devices within proximity of the plurality of machine devices. The program instructions are executable by the processor to further cause the processor to provide a VR environment for display on a VR headset of a user. The VR environment comprises a VR model of the physical environment. The program instructions are executable by the processor to further cause the processor to receive, as input, VR interaction data indicative of one or more VR interactions of the user in the VR environment. The program instructions are executable by the processor to further cause the processor to determine, based on the VR interaction data, which of the plurality of machine devices the one or more VR interactions involve, and proactively awaken at least one IoT device of the plurality of IoT devices based on which of the plurality of machine devices the one or more VR interactions involve.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
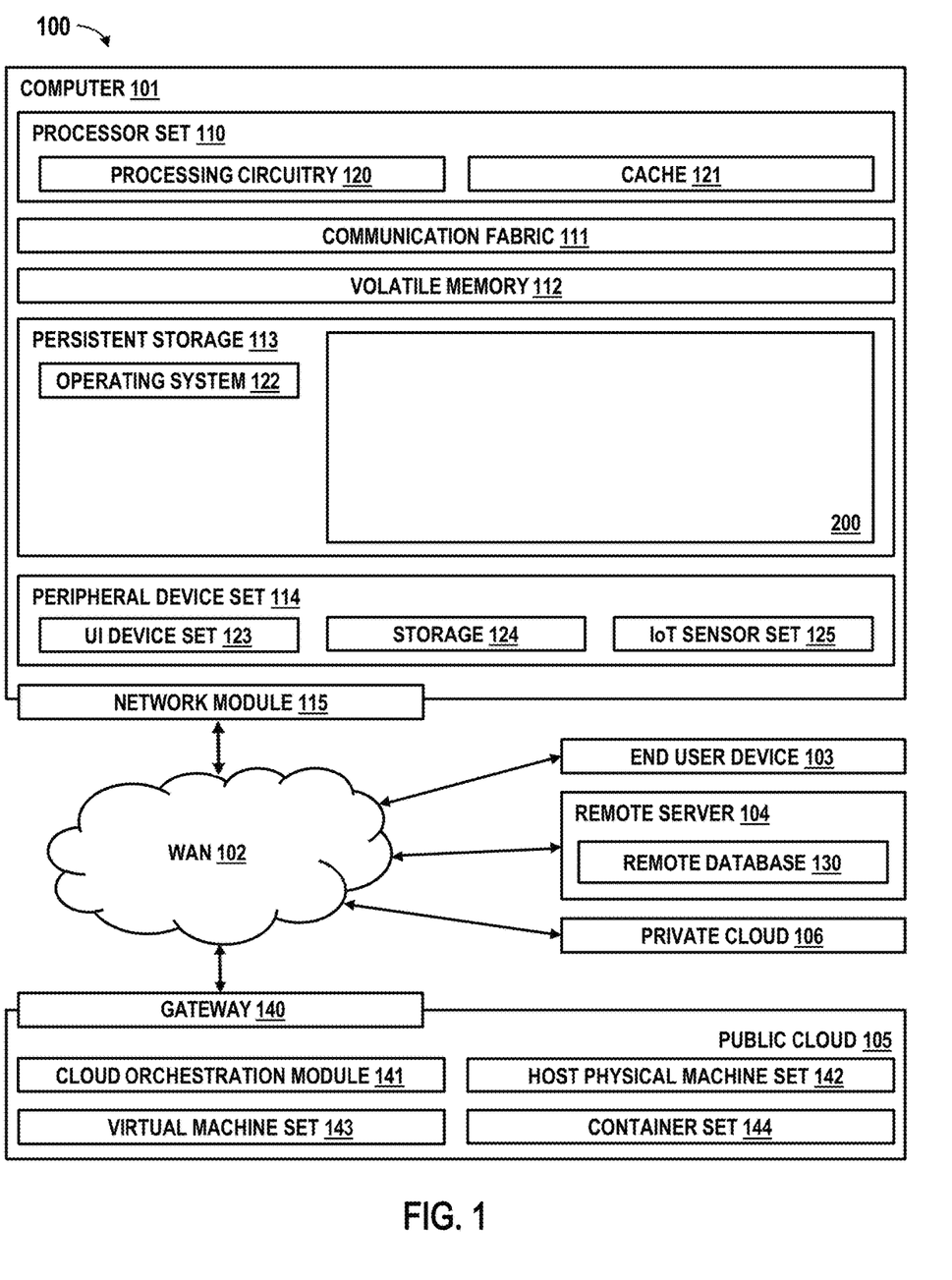
FIG. 1 depicts a computing environment according to an embodiment of the present invention.

FIG. 1 depicts a computing environment 100 according to an embodiment of the present invention. Computing environment 100 contains an example of an environment for the execution of at least some of the computer code involved in performing the inventive methods, such as proactive preparation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A VR interaction is a virtual activity or a virtual movement that a user of a VR device performs in a VR environment.

Figure 2:
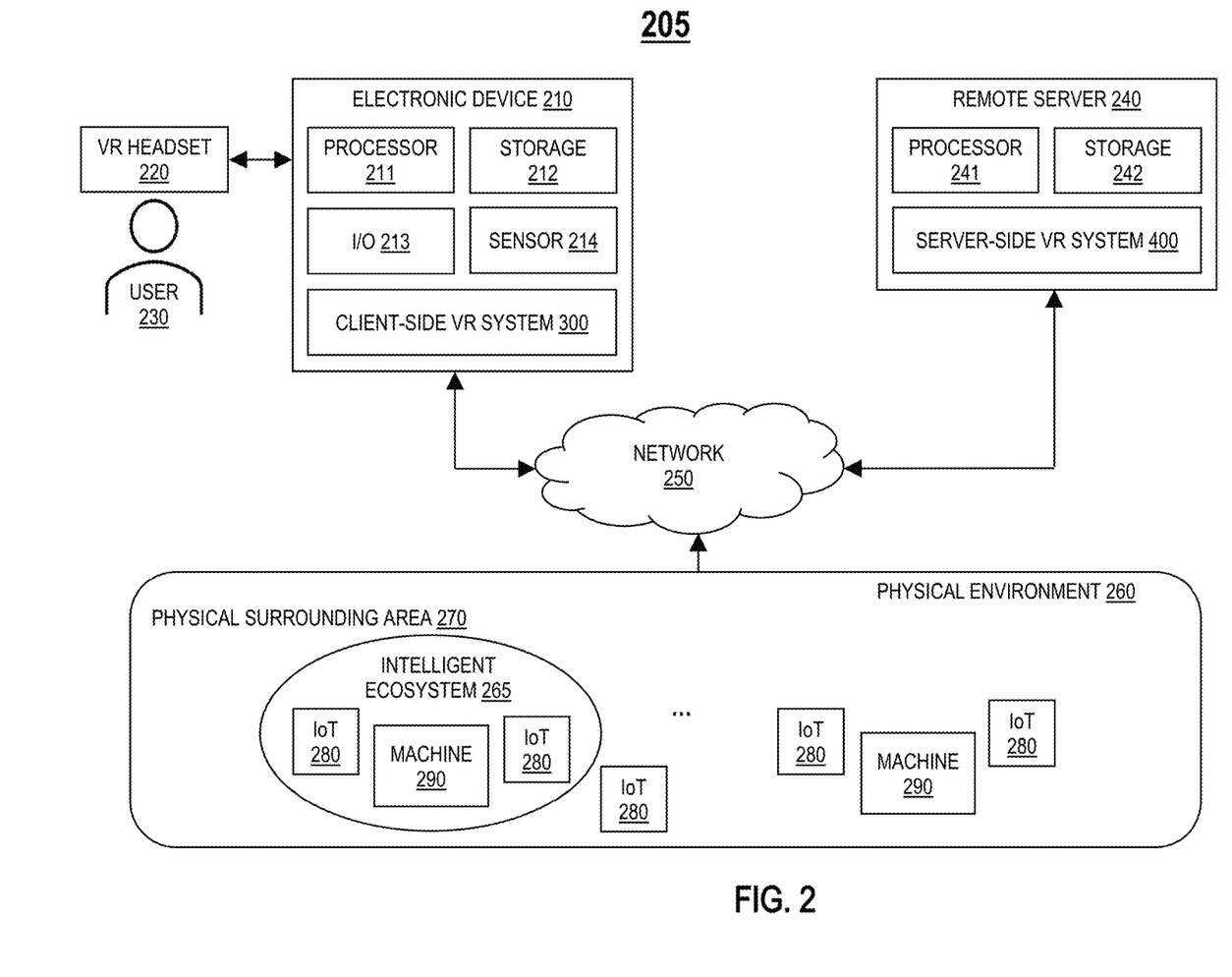
FIG. 2 illustrates an example computing architecture for implementing proactive preparation of an intelligent ecosystem in a mapped physical surrounding based on a virtual reality (VR) interaction, in accordance with an embodiment of the invention.

FIG. 2 illustrates an example computing architecture 205 for implementing proactive preparation of an intelligent ecosystem in a mapped physical surrounding based on a VR interaction, in accordance with an embodiment of the invention. The computing architecture 205 comprises an electronic device 210. The electronic device 210 comprises computation resources such as, but not limited to, one or more processor units 211 and one or more storage units 212.

In one embodiment, the electronic device 210 comprises a VR headset 220 integrated in or coupled to the electronic device 210. A user 230 may utilize the VR headset 220 by wearing the VR headset 220 on the head.

Examples of an electronic device 210 include, but are not limited to, a VR-enabled device, a desktop computer, a mobile electronic device (e.g., a tablet, a smart phone, a laptop, etc.), a wearable device (e.g., a smart watch, a VR headset 230, etc.), an Internet of Things (IoT) device, etc.

In one embodiment, the electronic device 210 comprises one or more input/output (I/O) units 213 integrated in or coupled to the electronic device 210/VR headset 220, such as a keyboard, a keypad, a touch interface, a display screen, a hand tracker, etc. The user 230 may utilize an I/O unit 213 to configure one or more user preferences, configure one or more parameters, provide user input, etc.

In one embodiment, the electronic device 210 comprises one or more sensor units 214 integrated in or coupled to the electronic device 210/VR headset 220, such as a camera, a microphone, a GPS, a motion sensor, an accelerometer, a gyroscope, etc. Sensor data relating to the user 230 may be collected via a sensor unit 214.

One or more applications may execute/operate on the electronic device 210 utilizing the computation resources of the electronic device 210. In one embodiment, the one or more applications on the electronic device 210 include, but are not limited to, a client-side VR system 300. The client-side VR system 205 is configured to provide, via the VR headset 220, a VR environment comprising a VR model of a physical environment 260. The VR model comprises one or more visualizations of the physical environment 260. Specifically, in one embodiment, the VR model comprises a streaming volumetric video including one or more VR objects representing one or more machine devices 290 in the physical environment 260.

In one embodiment, the VR model is a real-time VR model (i.e., comprises real-time visualizations of the physical environment 260).

The physical environment 260 may be remote to the user 230. Examples of a physical environment 260 include, but are not limited to, a workplace (e.g., an industrial floor), an educational institution (e.g., a school), a tourist attraction or point of interest, a place of recreation, leisure or sporting, etc.

In one embodiment, the physical environment 260 includes the one or more machine devices 290 (e.g., industrial machines) and one or more Internet of Things (IoT) device 280. Each machine device 290 is within proximity of at least one IoT device 280.

Examples of IoT devices 280 include, but are not limited to, motion sensors, image sensors (e.g., cameras), temperature sensors, proximity sensors, pressure sensors, accelerometer sensors, gyroscope sensors, sound sensors (e.g., microphones), etc.

As described in detail later herein, each machine device 290 in the physical environment 260 is mapped to a VR object in the VR environment, and each physical activity executing/to execute in the physical environment 260 is mapped to a VR activity executing/to execute in the VR environment.

In one embodiment, the VR environment further comprises context information relating to the physical environment 260 such as, but not limited to, sensor data (e.g., collected via at least one IoT device 280), status data of at least one machine device 290 (e.g., operating state, configuration, etc.), analytics data (e.g., from at least one IoT device 280), etc.

In one embodiment, the client-side VR system 205 allows the user 230 to perform one or more virtual movements in the VR environment. Specifically, the user 230 can virtually move towards at least one VR object in the VR environment by providing user input that are collected by at least one I/O device 213 and/or performing one or more movement-based user gestures that are detected by at least one sensor device 214.

As described in detail later herein, the client-side VR system 205 is further configured to allow the user 230 to remotely operate or control at least one machine device 290 based on one or more VR interactions of the user 230 in the VR environment.

In one embodiment, the electronic device 210/VR headset 220 is configured to exchange data with a remote server 240 and/or the one or more IoT devices 280 over a communications network/connection 250 (e.g., a wireless connection such as a Wi-Fi connection or a cellular data connection, a wired connection, or a combination of the two).

In one embodiment, the remote server 240 comprises computation resources, such as one or more processor units 241 and one or more storage units 242. One or more applications that provide higher-level services may execute/operate on the remote server 240 utilizing the computation resources of the remote server 240. In one embodiment, the one or more applications on the remote server 240 include, but are not limited to, a server-side VR system 400 (FIG. 3) configured to exchange data with a plurality of electronic devices 210 and/or a plurality of VR headsets 220 (worn by a plurality of users 230). In one embodiment, the remote server 240 is a centralized server. In another embodiment, the remote server 240 is a distributed server.

VR interaction data of a user 230 is indicative of one or more VR interactions and/or one or more virtual movements of the user 230 in a VR environment.

In one embodiment, the server-side VR system 400 is configured to: (1) receive VR interaction data of a user 230 (e.g., from an electronic device 210/VR headset 220), (2) analyze the VR interaction data to determine a machine device 290 in the physical environment 260 that the user 230 is remotely controlling/operating or intends to remotely control/operate, and (3) proactively prepare an intelligent ecosystem 265 to execute and control various autonomous and intelligent physical activities relating to the machine device 290, such as collecting real-time context information. The intelligent ecosystem 265 includes at least one IoT device 280 in a physical surrounding area 270 (i.e., within proximity) of the machine device 290.

Figure 3:
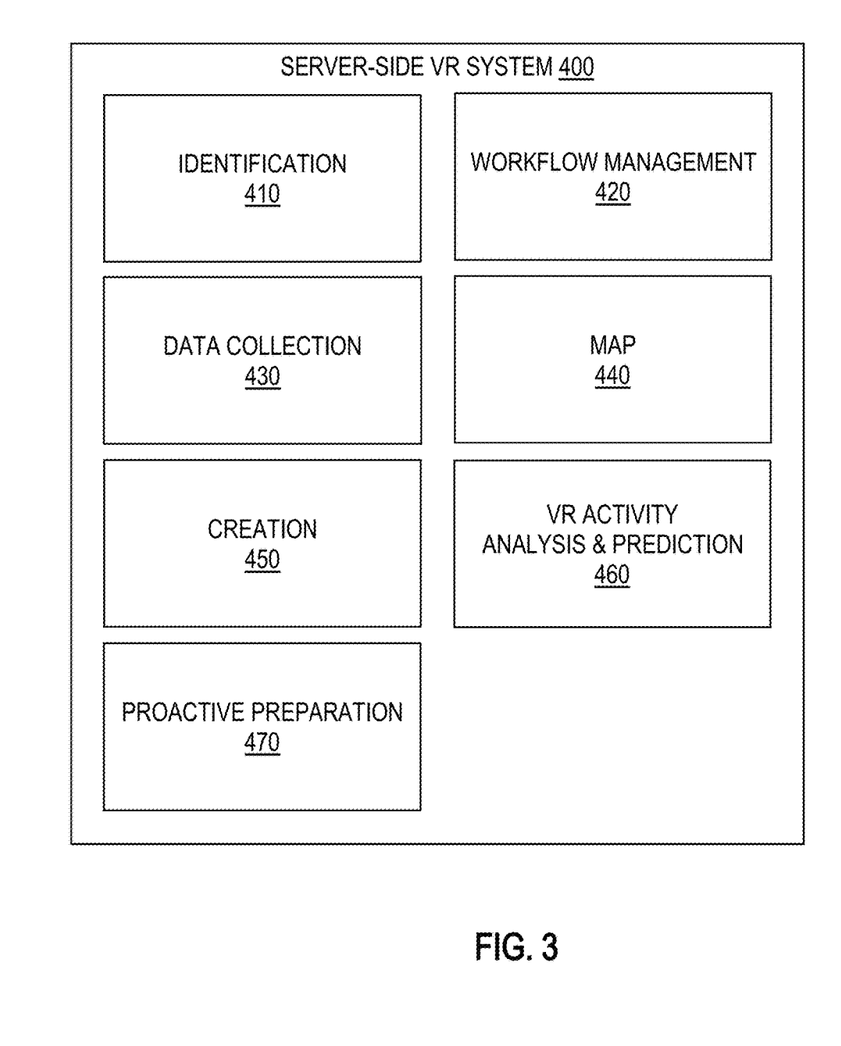
FIG. 3 illustrates a server-side VR system in detail, in accordance with an embodiment of the invention.

FIG. 3 illustrates the server-side VR system 400 in detail, in accordance with an embodiment of the invention. In one embodiment, the server-side VR system 400 comprises an identification unit 410. For each physical environment 260, the identification unit 410 is configured to: (1) individually identify each machine device 290 in the physical environment 260 including a category of the machine device 290, (2) individually identify each IoT device 280 in the physical environment 260 including a type of the IoT device 280 (e.g., audio capture, mobility capture, etc.), and (3) update corresponding identification data to include information about each machine device 290 identified (e.g., identification name/number, status, and category of each machine device 290) and each IoT device 280 (e.g., identification name/number, status, and type of each IoT device 280) identified.

In one embodiment, the server-side VR system 400 maintains a database (e.g., on a storage unit 242) comprising, for each physical environment 260, corresponding identification data.

In one embodiment, the server-side VR system 400 comprises a workflow management unit 420. For each physical environment 260, the workflow management unit 420 is configured to determine, based on corresponding identification data, each physical activity that can be executed in the physical environment 260.

A physical activity that can be executed in the physical environment 260 may be executed by different machine devices 290 in different physical locations in the physical environment 260. For each physical activity that can be executed in the physical environment 260, the workflow management unit 420 is configured to: (1) determine a corresponding workflow including one or more steps to perform as part of the physical activity, (2) determine one or more machine devices 290 the one or more steps involve (i.e., determine the one or more machine devices 290 to perform the one or more steps), and (3) update workflow data corresponding to the physical environment 260 to include information about the corresponding workflow (e.g., the one or more steps to perform) and the one or more machine devices 290 the one or more steps involve. Different steps of a workflow may involve the same machine device 290 or different machine devices 290.

In one embodiment, the server-side VR system 400 maintains a database (e.g., on a storage unit 242) comprising, for each physical environment 260, corresponding workflow data.

In one embodiment, the server-side VR system 400 comprises a data collection unit 430. For each physical environment 260, the data collection unit 430 is configured to associate each machine device 290 identified (e.g., by the identification unit 410) in the physical environment 260 with one or more types of data to collect from one or more IoT devices 280 in a physical surrounding area 270 of the machine device 290.

A machine device 290 may execute different physical activities. For each physical activity that a machine device 290 may execute, the data collection unit 430 is configured to determine one or more types of data to collect from one or more IoT devices 280 in a physical surrounding area 270 of the machine device 290 when the machine device 290 is executing the physical activity.

In one embodiment, the server-side VR system 400 comprises a map unit 440. For each physical environment 260, the map unit 440 is configured to: (1) for each machine device 290 identified (e.g., by the identification unit 410) in the physical environment 260, determine a corresponding mapping that maps the machine device 290 to a corresponding VR object in a VR environment, (2) for each physical activity to execute in the physical environment 260, determine a corresponding mapping that maps the physical activity to a corresponding virtual activity to execute in the VR environment, and (3) update corresponding mapping data to include each mapping determined.

In one embodiment, the server-side VR system 400 maintains a database (e.g., on a storage unit 242) comprising, for each physical environment 260, corresponding mapping data.

In one embodiment, the server-side VR system 400 maintains a database (e.g., on a storage unit 242) comprising, for each physical environment 260, corresponding historical data (e.g., historical knowledge or configuration, etc.).

In one embodiment, the server-side VR system 400 comprises a creation unit 450. For each physical environment 260, the creation unit 450 is configured to: (1) create a corresponding VR model of the physical environment 260, wherein the corresponding VR model comprises a streaming volumetric video including one or more VR objects that one or more machine devices 290 in the physical environment 260 are mapped to, and (2) provide a corresponding VR environment that includes the corresponding VR model for display on one or more VR headsets 220 of one or more users 230. In one embodiment, a VR model created by the creation unit 450 is a real-time VR model.

In one embodiment, the server-side VR system 400 comprises an VR activity analysis and prediction unit 460. For each physical environment 260, the VR activity analysis and prediction unit 460 is configured to: (1) receive VR interaction data of a user 230 in a corresponding VR environment, and (2) analyze the VR interaction data to determine a machine device 290 in the physical environment 260 that the user 230 is remotely controlling/operating or intends to remotely control/operate.

In one embodiment, to determine which machine device 290 in a physical environment 260 a user 230 is remotely controlling/operating, the VR activity analysis and prediction unit 460 performs the following operations: The VR activity analysis and prediction unit 460 analyzes VR interaction data of the user 230 to determine a current virtual activity of the user 230 in a corresponding VR environment and a VR object the current virtual activity involves. Based on mapping data and workflow data corresponding to the physical environment 260, the VR activity analysis and prediction unit 460 determines: (1) a physical activity executing in the physical environment 260 that the current virtual activity maps to, (2) a machine device 290 in the physical environment 260 that the VR object maps to (and that the physical activity involves), and (3) a step and a relative position of the step in a workflow corresponding to the physical activity and that involves the machine device 290.

In one embodiment, to determine which machine device 290 in a physical environment 260 a user 230 intends to remotely control/operate, the VR activity analysis and prediction unit 460 performs the following operations: The VR activity analysis and prediction unit 460 analyzes VR interaction data of the user 230 to determine a virtual direction (i.e., mobility direction, e.g., north, south, etc.) of a virtual movement of the user 230 in a corresponding VR environment. Based on mapping data corresponding to the physical environment 260, the VR activity analysis and prediction unit 460 determines a physical direction in the physical environment 260 that the virtual direction maps to. Based on a current virtual activity of the user 230, the physical direction, and workflow data and historical data corresponding to the physical environment 260, the VR activity analysis and prediction unit 460 performs the following operations: (1) predicts a physical activity the user 230 intends to execute in the physical environment 260, (2) predicts a machine device 290 that the predicted physical activity will involve, (3) determines a step and a relative position of the step in a workflow corresponding to the predicted physical activity (and that involves the predicted machine device 290), and (4) predicts a physical movement path towards a physical surrounding area 270 in the physical environment 260 where the predicted physical activity will execute (and the predicted machine device 290 is located).

In one embodiment, the server-side VR system 400 comprises a proactive preparation unit 470. If a user 230 is remotely controlling/operating or intends to remotely control/operate a machine device 290 in a physical environment 260, the proactive preparation unit 470 is configured to proactively prepare an intelligent ecosystem 265 to execute and control various autonomous and intelligent physical activities relating to the machine device 290, such as collecting real-time context information. In one embodiment, the proactive preparation unit 470 performs the following operations: based on identification data, workflow data, and historical data corresponding to the physical environment 260, the proactive preparation unit 470 determines: (1) which IoT devices 280 within proximity of the machine device 290 to select for proactive awakening, and (2) a physical boundary of a physical surrounding area 270, wherein all IoT devices 280 selected for proactive awakening are within the physical boundary. The physical boundary defines an amount of physical area the intelligent ecosystem 265 covers. The physical surrounding area 270 encompasses the intelligent ecosystem 265 which includes all IoT devices 280 selected for proactive awakening. Awakening generally refers to, but is not limited to, a wake-up process (or waking up process) in which one or more IoT devices 280 are wakened (e.g., from a sleep/idle/standby/low power mode to an active/run mode) to execute and control various autonomous and intelligent physical activities relating to one or more machine devices 290, such as collecting real-time context information.

When proactively awakened, some IoT devices 280 (e.g., sensors) in an intelligent ecosystem 265 collect real-time context information such as, but not limited to, temperature, ambient lighting, operating state and/or configuration of a machine device 290, etc. The proactive preparation unit 470 may analyze real-time context information to determine one or more additional IoT devices 280 to select for proactive awakening. Real-time context information may be provided for display on a VR headset 220 of a user 230. For example, if a physical environment 260 is an industrial floor, different types of real-time context information collected may include voices or sounds of at least one worker on the industrial floor, sounds of at least one machine device 290 on the industrial floor, at least one physical activity involving the at least one machine device 290, etc.

If multiple users 230 remotely control/operate or intend to remotely control/operate multiple machine devices 290 in a physical environment 260 (i.e., the multiple users 230 perform VR interactions in a corresponding VR environment), the proactive preparation unit 470 is configured to proactively prepare an intelligent ecosystem 265 to execute and control various autonomous and intelligent physical activities relating to the multiple machine devices 290, such as collecting real-time context information. Specifically, the proactive preparation unit 470 aggregates each amount of physical surrounding area 270 determined for each of the multiple machine devices 290, resulting in an aggregated amount of physical surrounding area 270 that will encompass all of the multiple machine devices 290 and all IoT devices 280 selected for proactive awakening.

In one example application use case where a physical environment 260 is a workplace (e.g., an industrial floor), the server-side VR system 400 determines how many workers (i.e., users 230) are virtually working using VR headsets 220 ("virtually present workers"), respective mapped physical locations of the virtually present workers 230 in the physical environment 260, aggregated intent of the virtually present workers 230 (i.e., which machine devices 290 the virtually present workers 230 intend to remotely control/operate), and a physical boundary of an aggregated physical surrounding area 270. The aggregated physical surrounding area 270 encompasses an intelligent ecosystem 265 including one or more IoT devices 280 within the physical boundary. The server-side VR system 400 proactively awakens all IoT devices 280 of the intelligent ecosystem 265 to execute and control various autonomous and intelligent physical activities, such as collecting real-time context information.

In another example application use case where a physical environment 260 is a workplace with a hybrid workplace policy (e.g., an office), the server-side VR system 400 determines which workers are physically present ("physically present workers"), which workers are virtually present workers 230, respective mapped physical locations of the virtually present workers 230 in the physical environment 260, aggregated intent of the virtually present workers 230 (i.e., which machine device 290 the virtually present workers 230 intend to remotely control/operate), and a physical boundary of an aggregated physical surrounding area 270. The aggregated physical surrounding area 270 encompasses an intelligent ecosystem 265 including one or more IoT devices 280 within the physical boundary. The server-side VR system 400 proactively awakens all IoT devices 280 of the intelligent ecosystem 265 to execute and control various autonomous and intelligent physical activities, such as collecting real-time context information. The number and different types of IoT devices 280 proactively awakened may depend on the amount of physically present workers and the amount of virtually present workers 230.

Figure 4:
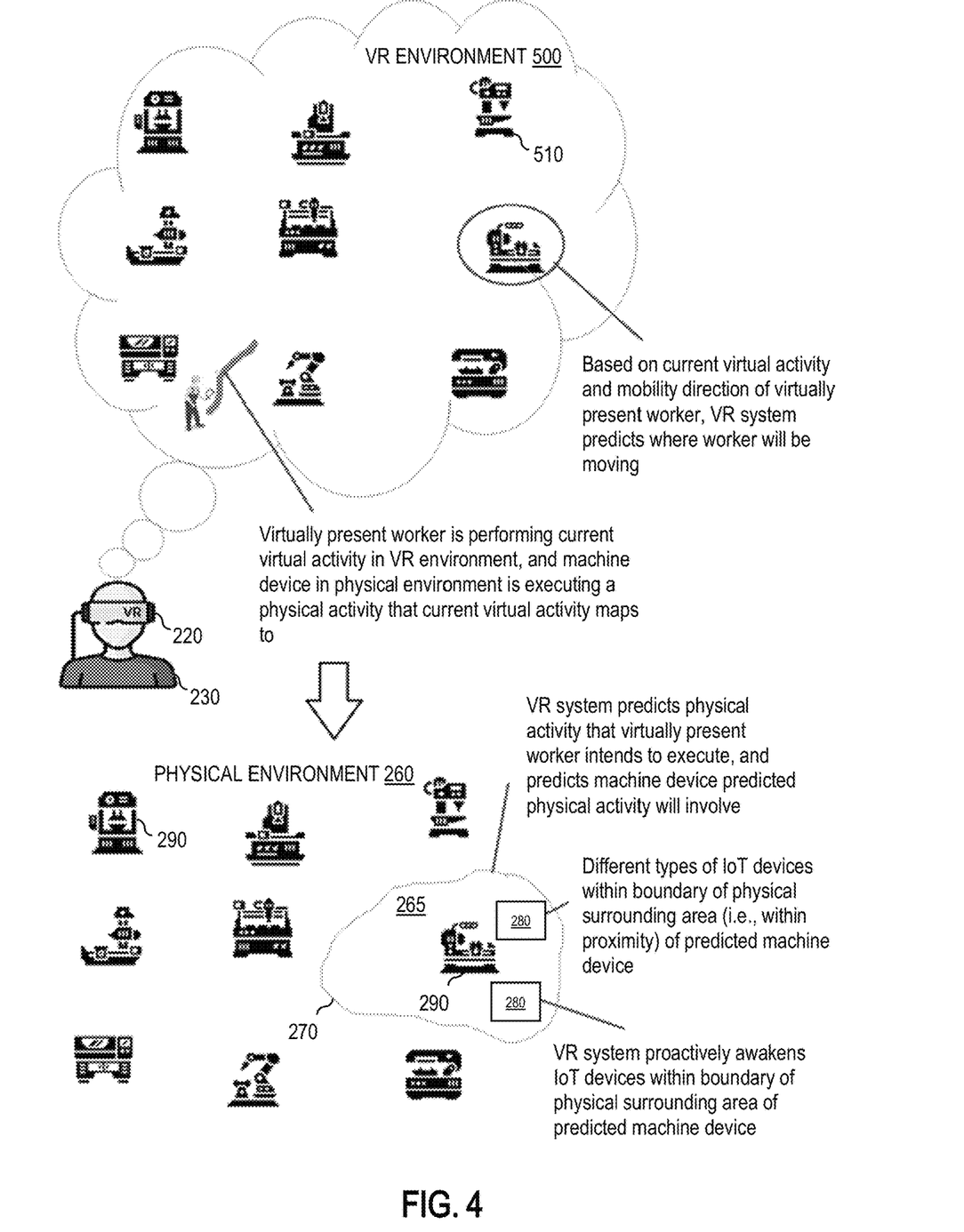
FIG. 4 illustrates an example application use case, in accordance with an embodiment of the invention.

FIG. 4 illustrates an example application use case, in accordance with an embodiment of the invention. As shown in FIG. 4, assume a physical environment 260 is an industrial floor including a plurality of machine devices 290 (i.e., industrial machines). As shown in FIG. 4, a user 230 is a virtually present worker 230 who is virtually working using a VR headset 220. The VR headset 220 provides a VR environment 500 corresponding to the physical environment 260. For each machine device 290 in the physical environment 260, the VR environment 500 comprises a corresponding VR object 510 that is mapped to the machine device 290.

As shown in FIG. 4, the virtually present worker 230 is performing a current virtual activity in the VR environment 500. The server-side VR system 400 determines a physical activity that the current virtual activity maps to, and further determines a machine device 290 in the physical environment 260 that is executing the physical activity.

As shown in FIG. 4, the server-side VR system 400 determines a virtual direction (i.e., mobility direction, e.g., north, south, etc.) of a virtual movement of the virtually present worker 230 in the VR environment 500, and determines a physical direction in the physical environment 260 that the virtual direction maps to. Based on the current virtual activity and the physical direction, the server-side VR system 400 predicts a physical activity the virtually present worker 230 intends to execute in the physical environment 260, predicts a machine device 290 that the predicted physical activity will involve, and predicts a physical movement path towards a physical surrounding area 270 in the physical environment 260 where the predicted physical activity will execute (and the predicted machine device 290 is located).

As shown in FIG. 4, the server-side VR system 400 selects IoT devices 280 within proximity of the predicted machine device 290 for proactive awakening. The server-side VR system 400 determines a physical boundary of a physical surrounding area 270, where all IoT devices 280 selected for proactive awakening are within the physical boundary. The physical surrounding area 270 encompasses an intelligent ecosystem 265 which includes all IoT devices 280 selected for proactive awakening. The server-side VR system 400 proactively awakens all IoT devices 280 of the intelligent ecosystem 265 to execute and control various autonomous and intelligent physical activities, such as collecting real-time context information.

Figure 5:
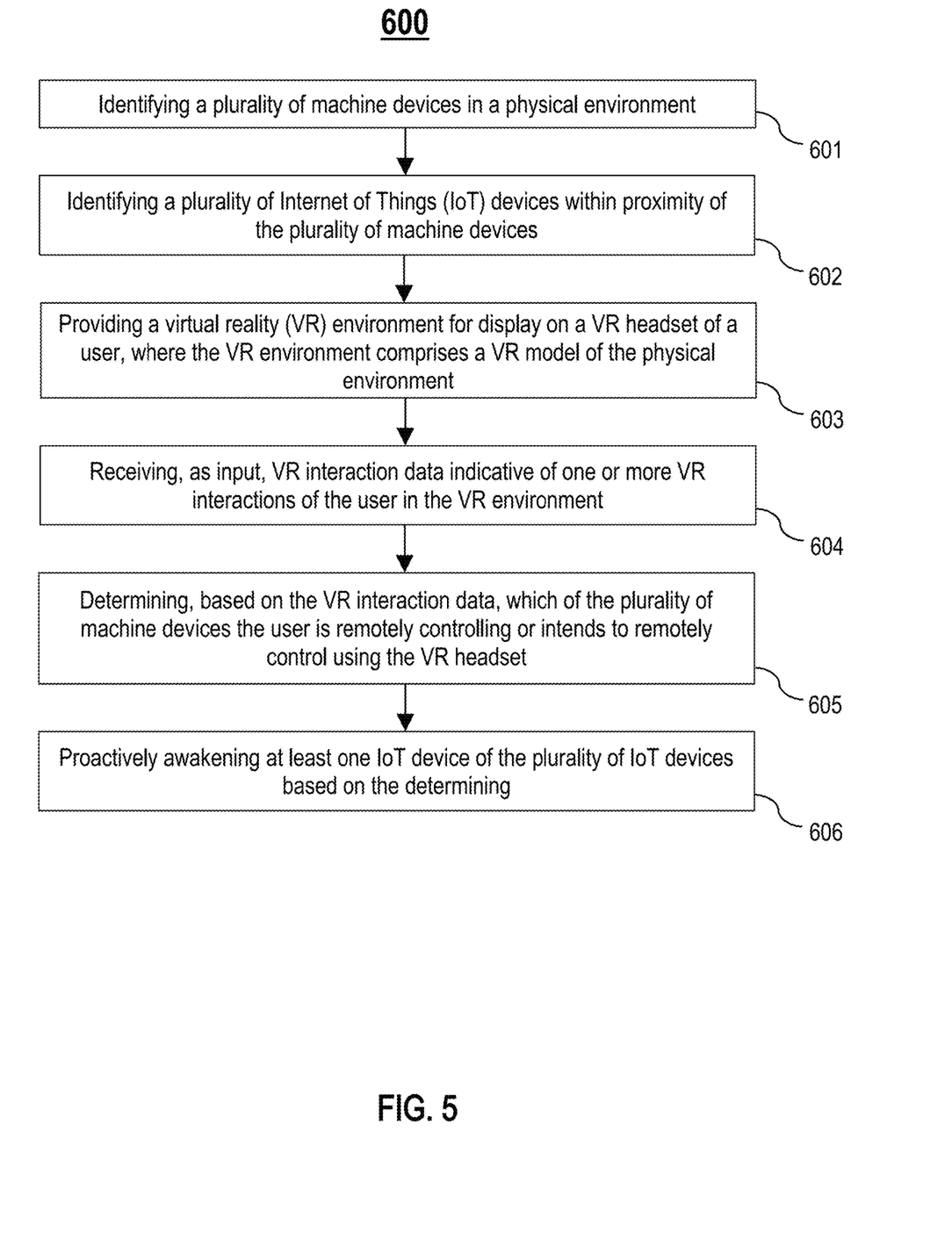
FIG. 5 is a flowchart for an example process for implementing proactive preparation of an intelligent ecosystem of IoT devices based on a VR interaction, in accordance with an embodiment of the invention.

FIG. 5 is a flowchart for an example process 600 for implementing proactive preparation of an intelligent ecosystem of IoT devices based on a VR interaction. Process block 601 includes identifying a plurality of machine devices in a physical environment. Process block 602 includes identifying a plurality of IoT devices within proximity of the plurality of machine devices. Process block 603 includes providing a VR environment for display on a VR headset of a user, where the VR environment comprises a VR model of the physical environment. Process block 604 includes receiving, as input, VR interaction data indicative of one or more VR interactions of the user in the VR environment. Process block 605 includes determining, based on the VR interaction data, which of the plurality of machine devices the user is remotely controlling or intends to remotely control using the VR headset. Process block 606 includes proactively awakening at least one IoT device of the plurality of IoT devices based on the determining.

In one embodiment, process blocks 601-606 are performed by one or more components of the server-side VR system 400.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112(f), unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for proactive preparation of an intelligent ecosystem of Internet of Things (IoT) devices based on a virtual reality (VR) interaction, comprising:
    identifying a plurality of machine devices in a physical environment;
    identifying a plurality of IoT devices within proximity of the plurality of machine devices;
    providing a VR environment for display on a VR headset of a user, wherein the VR environment comprises a VR model of the physical environment;
    receiving, as input, VR interaction data indicative of one or more VR interactions of the user in the VR environment;
    mapping a location of the user in the physical environment based on a virtual presence of the user in the VR environment and one or more physical sensors;
    generating a workflow for the user in the VR environment corresponding to the mapped location in the physical environment;
    predicting a physical activity for one or more action in the workflow;
    determining, based on the VR interaction data and the physical activity, the mapped location of the user in the physical environment, and locations of the plurality of machine devices, which of the plurality of machine devices the one or more VR interactions involve; and
    proactively awakening at least one IoT device of the plurality of IoT devices based on the determining.

2. The method of claim 1, further comprising:
    creating a streaming volumetric video comprising a plurality of VR objects, wherein each VR object of the plurality of VR objects maps to a machine device of the plurality of machine devices, and the VR model of the physical environment comprises the streaming volumetric video.

3. The method of claim 1, wherein the VR model is a real-time VR model.

4. The method of claim 1, further comprising:
    determining, based on the VR interaction data, a current virtual activity of the user in the VR environment;
    determining a physical activity executing in the physical environment that the current virtual activity maps to; and
    determining which machine device of the plurality of machine devices the physical activity involves, wherein the user is remotely controlling the machine device using the VR headset.

5. The method of claim 1, further comprising:
determining, based on the VR interaction data, a virtual direction of a virtual movement of the user in the VR environment;
determining a physical direction in the physical environment that the virtual direction maps to; and
predicting, based on a current virtual activity of the user and the physical direction, a physical activity the user intends to execute in the physical environment and which machine device of the plurality of machine devices the physical activity will involve, wherein the user intends to remotely control the machine device using the VR headset.

6. The method of claim 1, further comprising:
selecting the at least one IoT device for proactive awakening;
determining a physical boundary of a physical surrounding area based on the selecting, wherein each IoT device selected for proactive awakening is within the physical boundary; and
collecting real-time context information using each IoT device in the physical surrounding area.

7. The method of claim 1, wherein the plurality of IoT devices comprise one or more sensors.

8. The method of claim 1 further comprising:
determining a virtual direction of a virtual movement of the user in the VR environment; and
determining, based on the virtual direction and mapping data corresponding to the physical environment, a physical direction in the physical environment that the virtual direction.

9. A system for proactive preparation of an intelligent ecosystem of Internet of Things (IoT) devices based on a virtual reality (VR) interaction, comprising:
at least one processor; and
a non-transitory processor-readable memory device storing instructions that when executed by the at least one processor causes the at least one processor to perform operations including:
identifying a plurality of machine devices in a physical environment; identifying a plurality of IoT devices within proximity of the plurality of machine devices;
providing a VR environment for display on a VR headset of a user, wherein the VR environment comprises a VR model of the physical environment;
receiving, as input, VR interaction data indicative of one or more VR interactions of the user in the VR environment;
mapping a location of the user in the physical environment based on a virtual presence of the user in the VR environment and one or more physical sensors;
generating a workflow for the user in the VR environment corresponding to the mapped location in the physical environment;
predicting a physical activity for one or more action in the workflow;
determining, based on the VR interaction data and the physical activity, the mapped location of the user in the physical environment, and locations of the plurality of machine devices, which of the plurality of machine devices the one or more VR interactions involve; and
proactively awakening at least one IoT device of the plurality of IoT devices based on the determining.

10. The system of claim 9, wherein the operations further include:
creating a streaming volumetric video comprising a plurality of VR objects, wherein each VR object of the plurality of VR objects maps to a machine device of the plurality of machine devices, and the VR model of the physical environment comprises the streaming volumetric video.

11. The system of claim 9, wherein the VR model is a real-time VR model.

12. The system of claim 9, wherein the operations further include:
determining, based on the VR interaction data, a current virtual activity of the user in the VR environment;
determining a physical activity executing in the physical environment that the current virtual activity maps to; and
determining which machine device of the plurality of machine devices the physical activity involves, wherein the user is remotely controlling the machine device using the VR headset.

13. The system of claim 9, wherein the operations further include:
determining, based on the VR interaction data, a virtual direction of a virtual movement of the user in the VR environment;
determining a physical direction in the physical environment that the virtual direction maps to; and
predicting, based on a current virtual activity of the user and the physical direction, a physical activity the user intends to execute in the physical environment and which machine device of the plurality of machine devices the physical activity will involve, wherein the user intends to remotely control the machine device using the VR headset.

14. The system of claim 9, wherein the operations further include:
selecting the at least one IoT device for proactive awakening;
determining a physical boundary of a physical surrounding area based on the selecting, wherein each IoT device selected for proactive awakening is within the physical boundary; and
collecting real-time context information using each IoT device in the physical surrounding area.

15. The system of claim 9, wherein the plurality of IoT devices comprise one or more sensors.

16. A computer program product for proactive preparation of an intelligent ecosystem of Internet of Things (IoT) devices based on a virtual reality (VR) interaction, the computer program product comprising a computer readable storage medium having program instructions embodied therewith, the program instructions executable by a processor to cause the processor to:
identify a plurality of machine devices in a physical environment;
identify a plurality of IoT devices within proximity of the plurality of machine devices;
provide a VR environment for display on a VR headset of a user, wherein the VR environment comprises a VR model of the physical environment;
receive, as input, VR interaction data indicative of one or more VR interactions of the user in the VR environment;
map a location of the user in the physical environment based on a virtual presence of the user in the VR environment and one or more physical sensors;

generate a workflow for the user in the VR environment corresponding to the mapped location in the physical environment;

predict a physical activity for one or more action in the workflow;

determine, based on the VR interaction data and the physical activity, the mapped location of the user in the physical environment, and locations of the plurality of machine devices, which of the plurality of machine devices the one or more VR interactions involve; and proactively awaken at least one IoT device of the plurality of IoT devices based on which of the plurality of machine devices the one or more VR interactions involve.

17. The computer program product of claim 16, wherein the program instructions are executable by the processor to further cause the processor to:

create a streaming volumetric video comprising a plurality of VR objects, wherein each VR object of the plurality of VR objects maps to a machine device of the plurality of machine devices, and the VR model of the physical environment comprises the streaming volumetric video.

18. The computer program product of claim 16, wherein the VR model is a real-time VR model.

19. The computer program product of claim 16, wherein the program instructions are executable by the processor to further cause the processor to:

determine, based on the VR interaction data, a current virtual activity of the user in the VR environment;

determine a physical activity executing in the physical environment that the current virtual activity maps to; and determine which machine device of the plurality of machine devices the physical activity involves, wherein the user is remotely controlling the machine device using the VR headset.

20. The computer program product of claim 16, wherein the program instructions are executable by the processor to further cause the processor to:

determine, based on the VR interaction data, a virtual direction of a virtual movement of the user in the VR environment;

determine a physical direction in the physical environment that the virtual direction maps to; and predict, based on a current virtual activity of the user and the physical direction, a physical activity the user intends to execute in the physical environment and which machine device of the plurality of machine devices the physical activity will involve, wherein the user intends to remotely control the machine device using the VR headset.

* * * * *